(12) United States Patent
Yamasaki

(10) Patent No.: US 9,486,050 B2
(45) Date of Patent: Nov. 8, 2016

(54) DRAWING APPARATUS AND CONTROL METHOD OF THE DRAWING APPARATUS

(71) Applicant: CASIO COMPUTER CO., LTD., Shibuya-ku, Tokyo (JP)

(72) Inventor: Shuichi Yamasaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/752,173

(22) Filed: Jun. 26, 2015

(65) Prior Publication Data

US 2016/0000204 A1 Jan. 7, 2016

(30) Foreign Application Priority Data

Jul. 1, 2014 (JP) .................................. 2014-135920

(51) Int. Cl.
*G06K 15/22* (2006.01)
*A45D 29/00* (2006.01)
*G06T 11/20* (2006.01)

(52) U.S. Cl.
CPC ............. *A45D 29/00* (2013.01); *G06T 11/203* (2013.01); *A45D 2029/005* (2013.01)

(58) Field of Classification Search
None
See application file for complete search history.

(56) References Cited

U.S. PATENT DOCUMENTS

| | | | | |
|---|---|---|---|---|
| 6,286,517 B1* | 9/2001 | Weber | ................... | A45D 29/00 132/200 |
| 6,525,724 B1* | 2/2003 | Takami | ................... | A45D 29/00 345/418 |
| 2012/0113171 A1* | 5/2012 | Murata | ................... | B41J 3/407 347/2 |
| 2012/0287192 A1* | 11/2012 | Yamasaki | .............. | B41J 3/4073 347/14 |
| 2013/0038647 A1* | 2/2013 | Hashimoto | ............ | A45D 29/00 347/2 |
| 2013/0038648 A1* | 2/2013 | Kasahara | ................. | B41J 3/407 347/2 |
| 2013/0083098 A1* | 4/2013 | Yamasaki | .............. | A45D 29/00 347/5 |
| 2014/0063084 A1* | 3/2014 | Yamasaki | .............. | B41J 3/4073 347/3 |
| 2014/0168668 A1* | 6/2014 | Nakajima | .............. | B41J 3/4073 358/1.6 |

FOREIGN PATENT DOCUMENTS

JP 2003534083 A 11/2003

* cited by examiner

*Primary Examiner* — Ted Barnes
(74) *Attorney, Agent, or Firm* — Holtz, Holtz & Volek PC

(57) ABSTRACT

A drawing apparatus comprises a controlling unit which adjusts a size of a design image formed by a image data, the image data includes position information of a key point which is predetermined set, without changing an aspect ratio of the design image and the relative position of the key point, generates an adjusted design image, and fits the adjusted design image to a drawing region of a nail; and a drawing unit for drawing the adjusted design image on the drawing region.

The controlling unit sets an adjustment point in the drawing region at the same relative positions in the longitudinal and lateral directions as the key point set on the design image, and, in the fitting, sets the adjusted design image to the drawing region at a position which the key point of the adjusted design image meets the adjustment point.

10 Claims, 11 Drawing Sheets

FIG.5

| CONTENTS | EXAMPLE | |
|---|---:|---|
| MODE NO | 1 | ⎫ |
| KEY POINT X [%] | 50 | ⎬ HEADER |
| KEY POINT Y [%] | 30 | |
| DESIGN WIDTH (W) [steps] | 6000 | |
| DESIGN HEIGHT (H) [steps] | 9000 | ⎭ |
| DRAWING DATA | | |

DRAWING APPARATUS AND CONTROL METHOD OF THE DRAWING APPARATUS

CROSS-REFERENCE TO RELATED APPLICATION

The present application is based upon and claims the benefit of priority from the prior Japanese Patent Application No. 2014-135920, filed Jul. 1, 2014, the entire contents of which are incorporated herein by reference.

BACKGROUND OF THE INVENTION

1. Field of the Invention

The present invention relates to a drawing apparatus and control method of the drawing apparatus.

2. Description of the Related Art

A drawing apparatus is known, for printing a design image on a nail. This kind of drawing apparatus is disclosed, for instance, in Japanese Unexamined Patent Application Publication No. 2003-534083. In this Japanese Patent Publication, a nail printer is described, which uses an ink-jet printing technique to draw a design image on a nail of a finger and/or a toe.

In the nail printer, a desired design image is enlarged or reduced in size in accordance with the shape of the nail, whereby the design image is made to fit to the shape of the nail and drawn on the nail.

As one example of the design images to be drawn on the nail, a pattern, a so called "French" with a tilt pattern is shown in FIG. 11A. In general, this design image is drawn on the tip of the nail.

Some examples of this design image (FIG. 11A) which is made fit to the nail of the finger are shown in FIG. 11B, FIG. 11C and FIG. 11D, respectively.

In a conventional method of fitting the design image to the nail, it is required to fit the "French" pattern to the nail while keeping round shapes in the pattern unchanged, and therefore, the aspect ratio of the design image cannot be changed.

For instance, if the design image is fit to the nail such that the central position of the design image in the transversal direction is made to meet the central position of the nail in the transversal direction and further the top side of the design image is made to meet the tip of the nail in the longitudinal direction, as shown in FIG. 11B, the desired design image will be drawn on the nail.

However, in the case of a wide nail as shown in FIG. 11C, when the design image is fitted to the wide nail in the above manner, a ratio of a portion where the design image is drawn to a nail region will relatively be large, and the design image drawn on the nail will be put out of balance when compared with the original design image, resulting in failure in fitting of the design image. Meanwhile, when the design image is fit to the nail such that the central position of the design image is made to meet the central position of the nail as shown in FIG. 11D, the ratio of the portion where the design image is drawn to the nail region will relatively be small. In this case, the design image drawn on the nail will be put out of balance when compared with the original design image, resulting in failure in fitting of the design image.

As described above, when a design image is automatically fitted to a nail in accordance with the conventional fitting method, sometimes, the design image cannot be fitted to the nail in good balance, depending on the shape of the nail and the design image.

When the design image cannot be fitted to the nail in good balance, a user is required to adjust the fitting of design image manually, which applies a burden on the user. The advent of an drawing apparatus is expected, which can automatically fit a design image to nails of a wide variety of shapes in good balance.

SUMMARY OF THE INVENTION

The present invention provides a drawing apparatus and control method of the drawing apparatus, which can automatically fit a design image to nails of a wide variety of shapes in good balance.

According to one aspect of the invention, there is provided a drawing apparatus comprising a controlling unit which adjusts a size of a design image formed by a image data, the image data includes position information of a key point which is predetermined set, the position information indicates a position of the key point in the design image, without changing (a) a ratio of a longitudinal length and a lateral length of the design image and (b) a relative position of the key point in the design image, generates an adjusted design image from the design image whose size has been adjusted, and fits, as a fitting process, the adjusted design image to a drawing region of a nail of a finger or a toe of a user, and a drawing unit which draws the adjusted design image on the drawing region fitted by the controlling unit, wherein the controlling unit sets an adjustment point in the drawing region at the same relative positions in the longitudinal and the lateral directions as the key point set on the design image, sets a longitudinal direction and a lateral direction of the adjusted design image to the longitudinal direction and the lateral direction of the drawing region, sets a size of the adjusted design image to minimum size which covers the whole area of the drawing region, and sets, in the fitting process, the adjusted design image to the drawing region at a position which the key point of the adjusted design image meets the adjustment point.

According to another aspect of the invention, there is provided a control method of a drawing apparatus, the method comprising the steps of a step of adjusting a size of a design image formed of image data, the image data including position information which indicates a position of a key point previously set on a design image, without changing (a) a ratio of a longitudinal length to a lateral length of the design image and (b) a relative position of the key point on the design image, a step of generating an adjusted design image from the design image whose size has been adjusted, a step of setting an adjustment point in the drawing region at the same relative positions in the longitudinal and lateral directions as the key point set on the design image, a step of fitting the adjusted design image to a drawing region of a nail of a finger or a toe of a user, and a step of drawing the adjusted design image on the drawing region fitted in the step of fitting, wherein the step of generating the adjusted design image includes a step of setting a longitudinal direction and a lateral direction of the adjusted design image to the longitudinal direction and the lateral direction of the drawing region, and a step of setting the adjusted design image to minimum size which covers the whole area of the drawing region, the step of fitting the adjusted design image includes a step of setting the adjusted design image to the drawing region at a position which the key point of the adjusted design image meets the adjustment point.

BRIEF DESCRIPTION OF THE DRAWINGS

FIG. 5 is a view showing an example of a data format of design-image data prepared for the design image shown in FIG. 4.

DETAILED DESCRIPTION OF THE PREFERRED EMBODIMENTS

The embodiments of the invention will be described with reference to the accompanying drawings in detail. Throughout the description of the embodiments of the invention, like elements will be denoted by like numerals. Further in the following description, when a user confronts a nail printer to use the same, a term of "front" means the near side of the nail printer and a term of "back" means the rear side of the nail printer. Similarly, a term of "left" means the left side of the nail printer and a term of "right" means the right side of the nail printer.

In the embodiments of the invention, the nail printer 10 will be described as a printer used for drawing an image on the surface of a nail of a finger. The nail printer 10 can be used not only for drawing an image on the nail of a finger but also for drawing an image on the nail of a toed.

A configuration of the nail printer (drawing apparatus) 10 according to the embodiments of the invention will described with reference to FIG. 1 to FIG. 3.

Figure 1:
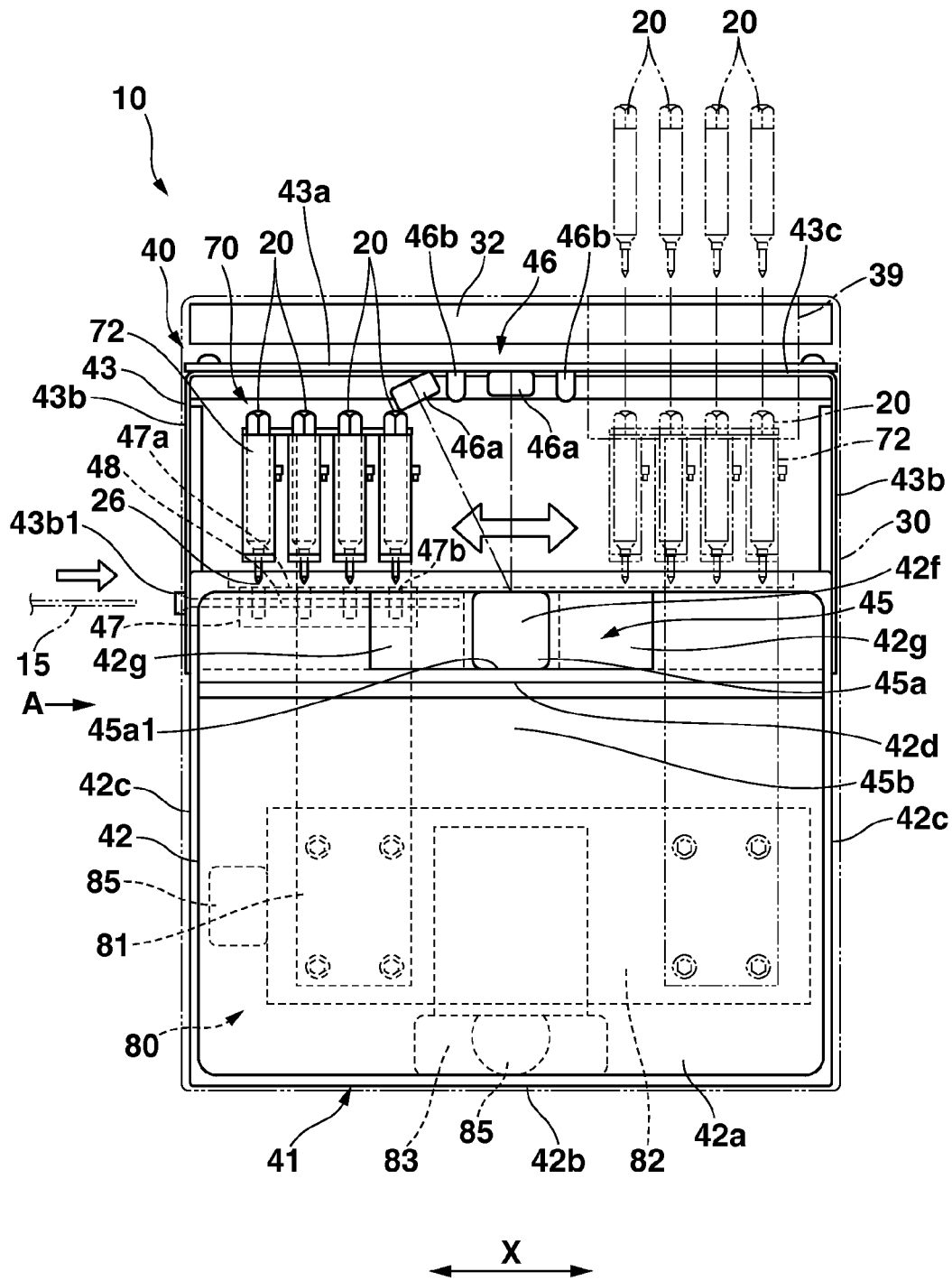
FIG. 1 is a front view of a nail printer according to the embodiments of the invention.

FIG. 1 is a front view of the nail printer 10 according to the embodiment of the invention. FIG. 2 is a partial cross-sectional side view of the nail printer 10, as seen in the direction indicated by an arrow "A" in FIG. 1, showing the internal construction of the nail printer 10.

Figure 2:
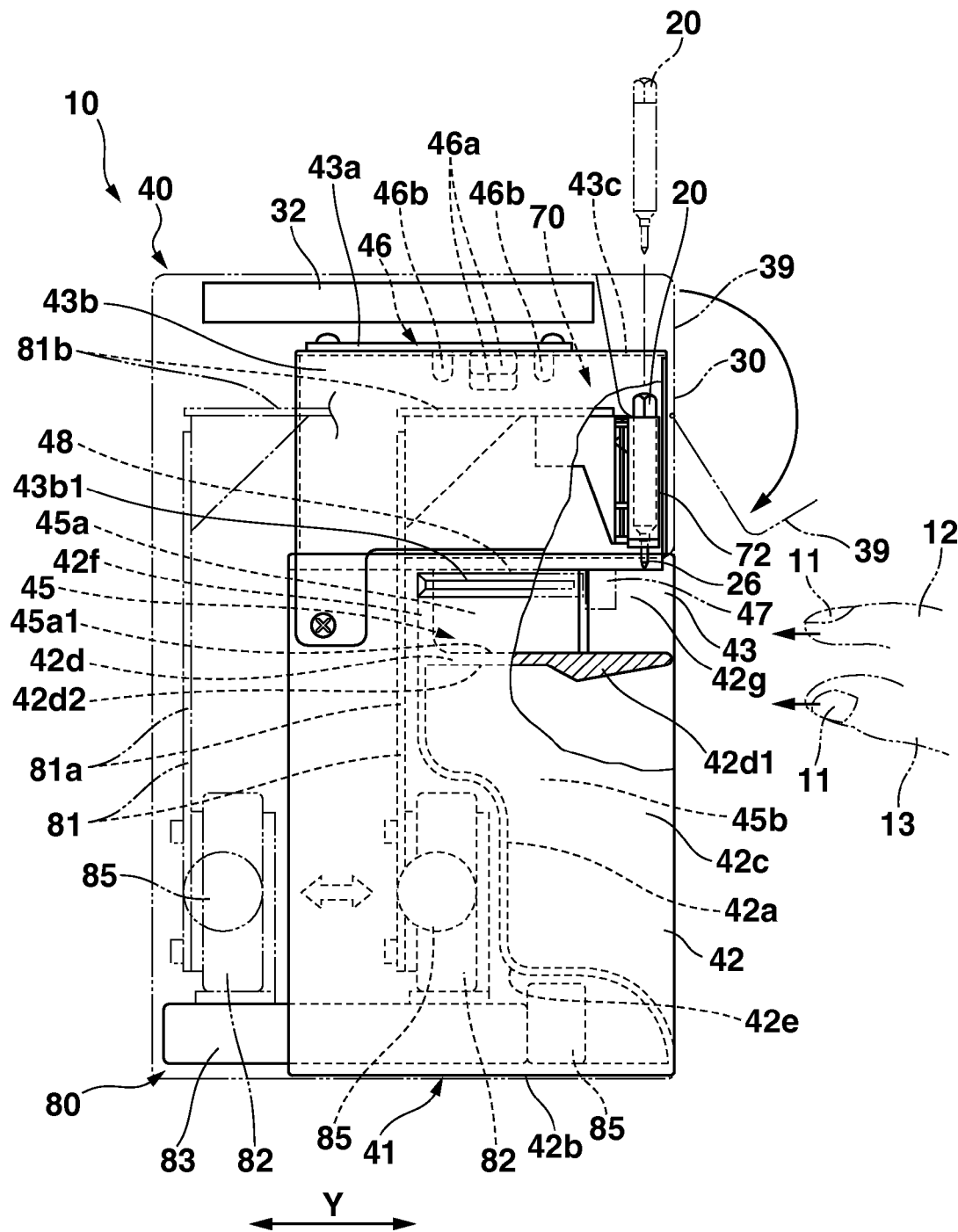
FIG. 2 is a partial cross-sectional side view of the nail printer, as seen in the direction indicated by an arrow "A" in FIG. 1, showing the internal construction of the nail printer.

As shown in FIG. 1 and FIG. 2, the nail printer 10 is a plotter of a pen type, used to draw a design image on the nail 11 of the finger of the user. The nail printer 10 consists of a case body 40 and a device body 41 accommodated in the case body 40. In FIG. 1 and FIG. 2, the case body 40 is indicated by a two-dot line.

The case body 40 is provided with a cover 39 on its one side (the right side in this embodiment). The cover 39 is opened to replace a pen (s).

An operation unit 31 and a displaying unit 32 (Refer to FIG. 3) are provided on the top surface of the case body 40.

The operation unit 31 includes various switches such as a power switch of the nail printer 10, a switch for stopping an operation, buttons for selecting a design image to be drawn on the nail 11 of a finger and a switch for instructing to start a drawing operation. The number of switches, functions of the switches, positions where the switched are disposed are determined arbitrarily.

For the displaying unit 32, various sorts of flat display devices such as a liquid crystal displaying device and/or an organic electro-luminescence displaying device can be used. On the displaying unit 32 are displayed a photographed image of a finger (drawing finger) 12 (hereinafter, the "finger image"), on which an image is to be drawn, a nail image included in the finger image (an outline of the nail 11), a design selection screen for selecting a design image to be drawn on the nail 11, thumbnail image for confirming the selected design image, and an instruction screen for giving various instructions. It is possible to mount a touch panel integrally on the displaying unit 32. The touch panel receives an instruction from the user, when the user touches on the surface of the displaying unit 32 with his/her finger, or using a stylus pen, and/or a pointed writing pen.

As shown in FIG. 1, the device body 41 is formed substantially in a box shape, and has a lower machine frame 42 mounted on the front lower-part of the case body 40 and an upper machine frame 43 mounted on the front upper-part of the case body 40 and fixed to the lower machine frame 42. The device body 41 is provided with a finger fixing unit 45 and a photographing unit 46. Further, the device body 41 is provided with a drawing unit 70 including pens 20, a moving unit 80 for moving the drawing unit 70 in the leftward and/or rightwards direction and in the frontward and/or rearward directions, a cap unit 47 for protecting the points 26 of the pens 20, a trial writing unit 48 for using the pens 20 on a trial basis, and a controlling device 51 (Refer to FIG. 3) for controlling operations of these units. The arbitrary number of pens 20 can be used in the nail printer 10 (drawing unit 70), but the nail printer 10 prepared with 4 pens will be described in the present embodiments of the invention.

The upper machine frame 43 is composed of a base plate 43a and a pair of upper side plates 43b, 43b. The base plate 43a is provided on the beneath surface of the displaying unit 32. The upper machine frame 43 is made with an opening 43c facing the cover 39 for replacing the pen 20. When the pen 20 is installed or replaced, the cover 39 is opened and the pen 20 can be installed into or removed from a pen holder 72 through the opening 43c with the drawing unit 70 moved to the right end. In practical use, when the operation unit 31 and the touch panel are operated by the user in accordance with an instruction displayed on the displaying unit 32 to select a design image, it is instructed, to which pen holder 72 and what color of pen 20 should be installed. For example, it is instructed that the pen 20 of No. 2 should be installed in the pen holder 72 of No. 1. When the pens have been installed in the pen holders 72 as instructed, then a desired design image will be set for drawing.

As shown in FIG. 2, the lower machine frame 42 is composed of a rear plate 42a, a bottom plate 42b, a pair of lower side plates 42c, 42c, and a separation wall 42d. The lower ends of the lower side plates 42c, 42c are connected to the both ends of the bottom plate 42b, respectively. The rear plate 42a is connected to the bottom plate 42b and the lower side plates 42c, 42c so as to cover the back side of a space surrounded by the bottom plate 42b and the lower side plates 42c, 42c. The rear plate 42a is formed in a stepwise form 42e. The separation wall 42d is provided horizontally within the lower machine frame 42 so as to vertically separate the space (which is defined by the rear plate 42a, the bottom plate 42b and the lower side plates 42c, 42c.) Both sides of the separation wall 42d are fixed to the lower side plates 42c, 42c, and the rear side of the separation wall 42d is fixed to the rear plate 42a.

The lower machine frame 42 is integrally provided with the finger fixing unit 45. The finger fixing unit 45 has a finger receiving unit 45a and a finger rest-space 45b. The finger receiving unit 45a is prepared above the separation wall 42d and disposed substantially at the center of the lower machine frame 42 when seen in the horizontal direction. The finger receiving unit 45a receives the drawing finger 12 corresponding to the nail 11, on which a design image is to be drawn. Meanwhile, the finger rest-space 45b is prepared beneath the separation wall 42d for stand-by of the fingers 13 other than the drawing finger 12.

The finger receiving unit 45a has openings at the front side and the upper side of the lower machine frame 42 respectively. The separation wall 42d provides a finger placing portion 45a1 at the bottom side of the finger receiving unit 45a. A front wall 42f is provided so as to stand on the front end of the separation wall 42d to cover the front side of the lower machine frame 42. Further, there are provided a pair of guide walls 42g, 42g on the upper surface of the separation wall 42, the width between which guide walls 42g, 42g becomes gradually narrower from the front wall 42f toward the finger receiving unit 45a. When the user inserts his/her finger into the printer 10, the pair of guide walls 42g, 42g guides the drawing finger 12 to the finger receiving unit 45a.

When the user inserts the fingers into the finger fixing unit 45, he/she is allowed to hold the separation wall 42d with his/her drawing finger 12 inserted into the finger receiving unit 45a and other fingers 13 put in the finger rest-space 45b, whereby his/her drawing finger 12 is steadily held in the finger receiving unit 45a.

Further, the separation wall 42d is formed with a projection or bulge 42d1 at its front bottom surface. The top surface of the separation wall 42d is flat. Meanwhile, separation wall 42d goes slim from the top of the projection 42d1 to the front end (the right end in FIG. 2) and a recess 42d2 is formed in the rear side of the projection 42d1. The projection 42d1 and the recess 42d1 formed in the separation wall 42 secure a space between the finger nail 11, on which a design image has been drawn, and the surface of the recess 42d2, when the fingers 13 other than the drawing finger 12 are put in the finger rest-space 45b. As a result, this space prevents the finger nail 11, on which a design image has been drawn, from touching the separation wall 42d and holds the ink drawn on the nail separate from the apparatus. As a result, the design image drawn on the nail 11 is kept safe from chafing.

In FIG. 1, the photographing unit 46 will be described in detail. The photographing unit 46 is mounted substantially at the center of the bottom surface of the base plate 43a, as shown in FIG. 1. The photographing unit 46 is provided with a camera 46a and a lighting lamp 46b. In the present embodiment, plural cameras (for example, two cameras) 46a, 46a and plural lighting lamps (for example, four lamps) 46b, 46b are provided. The cameras 46a, 46a, each having about 200 million pixels or more, are prepared to photograph the drawing finger 12 inserted in the finger receiving unit 45a and its nail 11. The plural lighting lamps 46b, 46b are disposed so as to surround the cameras 46a, 46a to light up the nail 11 of the drawing finger 12. White color LED can be effectively used as the lighting lamps 46b, 46b.

A nail-information detecting unit 59 to be described later (Refer to FIG. 3) detects information from an image of the drawing finger 12 including the nail 11, obtained by the cameras 46a, 46a which information contains a shape of the nail 11, a position of the nail 11 including positions in the horizontal and longitudinal directions, and a curvature of the nail 11. The photographing unit 46 is connected to a photographing-operation controlling unit 58 to be described later (Refer to FIG. 3) to be controlled thereby. The image data of the image photographed by the photographing unit 46 is stored in a nail-image storing area 55 (Refer to FIG. 3) of a memory unit 55.

In the photographing unit 46, at least one of the plural cameras 46a, 46a is disposed directly above the finger receiving unit 45 such that the camera 46a photographs the nail 11 from right above, and at least one of the plural cameras 46a, 46a is disposed on the upper side out of directly above the finger receiving unit 45 such that the camera 46a photographs the nail 11 from obliquely above. Photographing the nail 11 from directly above and obliquely above by the cameras 46a, 46a, the curvature of the nail 11 can be calculated more accurately, and a design image can be drawn on the curved nail 11 more appropriately.

As shown in FIG. 1 and FIG. 2, the moving unit 80 is provided with an X stage 82 and a Y stage 83. The X stage 82 moves a carriage 81 supporting the drawing unit 70 in the leftward and/or rightward directions as indicated by an arrow "X" in FIG. 1 and the Y stage 83 moves the carriage 81 in the frontward and/or rearward directions as indicated by an arrow "Y" in FIG. 2. The X stage 82 and the Y stage 83 each consist of a driving unit 85 including a stepping motor, a ball screw feeding mechanism, and guides. The driving unit 85 can use any driving means for moving the drawing unit 70 such as a servo-motor other than the stepping motor. The X stage 82 and the Y stage 83 can be a mechanism composed of shafts, guides, and wires other than a combination of the stepping motor, ball screw feeding mechanism, and guides.

The carriage 81 is composed of a lower carriage 81a extending upward from the X stage 82 and an upper carriage 81b extending frontward from the upper edge of the lower carriage 81a. The drawing unit 70 is fixed to the front end of the upper carriage 81b.

In the nail printer 10, the moving unit 80 arbitrarily moves the carriage 81 in the Y- and X-directions, thereby moving the pen 20 of the drawing unit 70 to an arbitrary position in the Y- and X-directions to draw a desired design on the nail 11.

The cap unit 47 shown in FIG. 1 will be described in detail. The cap unit 47 is disposed on the left or the right side of the finger receiving unit 45a, as shown in FIG. 1. The cap unit 47 has a cap body 47a and insertion holes 47b prepared in the top of the cap body 47a. The insertion holes 47b receive the points 26 of the pens 20 from the upper side. When the nail printer 10 is not used, the drawing unit 70 is moved to above the cap unit 47 to allow the points 26 of the pens 20 to insert in the insertion holes 47b, whereby the points 26 of the pens 20 are prevented form getting dry when the pens 20 are not in used. The number of insertion holes 47b can be determined arbitrarily depending on the number of pens 20 of the drawing unit 70. In the present embodiment, four insertion holes 47b are prepared in a line so as to meet the number of pens 20.

The trial writing unit 48 is composed of flat parts and disposed behind the cap unit 47. The upper side plate 43b on the left side is prepared with an insertion opening 43b1. A medium 15 on which an image is to be drawn is inserted onto the trial writing unit 48 through the insertion opening 43b1. Any medium, such as paper, on which an image can be drawn for the purpose of trial by using the wet point 26 of the pen 20 can be used as the medium 15. In the nail printer 10, the trial writing unit 48 is brought downward to touch the medium 15 with the point 26 of the pen 20 and draws a prescribed image such as "○" and "∞" on the medium on a trial basis, before drawing a design image on the nail 11, thereby preventing failure in drawing an image in the beginning due to a dry point of the pen 20. In this way, a design image can be drawn on the nail 11 with the point 26 of the pen in good condition. The prescribed image is not restricted to the special image but any image will do, such as "○" and "∞" which is simple in shape, requiring a little ink to draw. It is preferable to draw a trail image (prescribed image) on a little different position of the medium 15 every time the trial drawing is performed in the trial writing unit 48. When the trial images have been drawn all on the entire surface of the medium 15, a notice of "Please, replace paper" is displayed on the displaying unit 32, asking the user to replace the medium.

Figure 3:
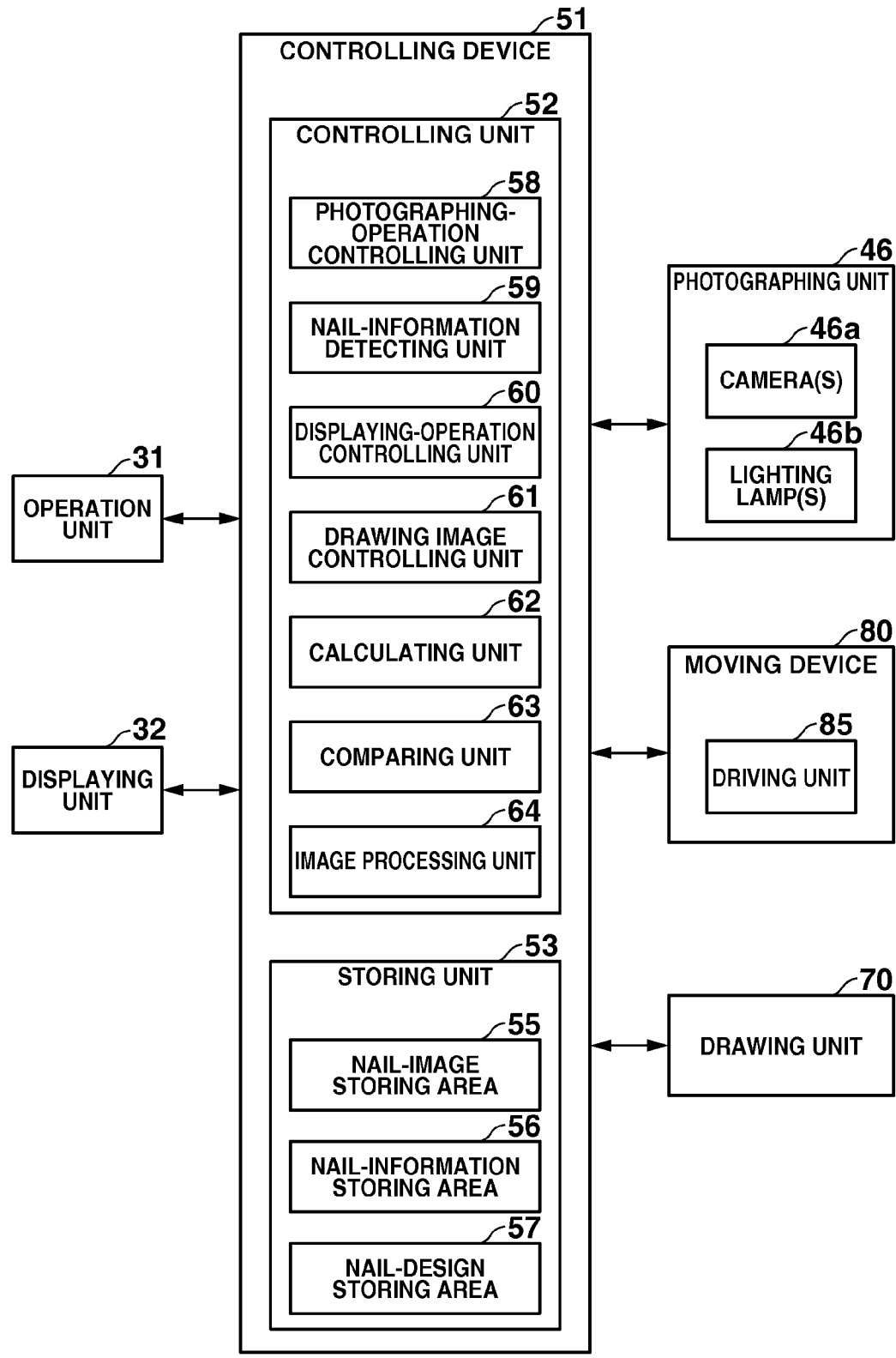
FIG. 3 is a block diagram of a configuration of the nail printer according to the embodiments of the invention.

FIG. 3 is a block diagram of a configuration of the nail printer 10 according to the embodiments of the invention. As shown in FIG. 3, the controlling device 51 comprises a controlling unit 52 and a storing unit 53. Further, the controlling unit 52 consists of CPU (Central Processing Unit) and the storing unit 53 consists of ROM (Read Only Memory) and RAM (Random Access Memory).

The storing unit 53 stores various sorts of programs and data required to operate the nail printer 10. More specifically, ROM of the storing unit 53 stores a various sorts of programs such as a nail-information detecting program and a drawing program. The nail-information detecting program, when executed by the CPU, detects a width and a length of the nail 11 from the outline of the photographed image of the nail 11. The drawing program is for drawing the design image on the nail 11 while enlarging or reducing in size the design image so as to cover the nail 11 with the aspect ratio of the design image kept constant, and making a key point defined on the design image (to be described later) meets an adjustment point on the nail 11, the adjustment point is in the drawing region at the same relative positions in the longitudinal and lateral directions as the key point set on the design image (to be described later), thereby fitting the design image enlarged or reduced in size to the nail 11, wherein the adjustment point is set at a position on the nail 11, which position corresponds to the position where the key point defined on the design image. The controlling device 51 executes these programs to control the operation of the nail printer 10.

The storing unit 53 is provided with a nail-image storing area 55 for storing a nail image of the nail 11 of the user's drawing finger 12 obtained by the photographing unit 46, a nail-information storing area 56 for storing nail information detected by the nail-information detecting unit 59, and a nail-design storing area 57 for storing design-image data to be drawn on the nail 11. For example, as shown in FIG. 5, key point information (position information) for data alignment representing an example of data construction is set in the design-image data. The key point information (position information) indicates a position of the key point in the longitudinal direction and the lateral direction of the design image. The key point information will be described with reference to FIG. 5 in detail.

The controlling unit 52 comprises a photographing-operation controlling unit 58, the nail-information detecting unit 59, a displaying operation controlling unit 60, a drawing image controlling unit 61, a calculating unit 62, a comparing unit 63, and an image processing unit 64. The functions of the photographing-operation controlling unit 58, nail infor-mation detecting unit 59, displaying operation controlling unit 60, drawing image controlling unit 61, calculating unit 62, comparing unit 63, and the image processing unit 64 are realized by CPU of the controlling unit 52 executing the programs stored in ROM of the storing unit 53.

The photographing-operation controlling unit 58 controls operation of the camera 46a of the photographing unit 46 and the lighting lamps 46b to photograph the drawing finger 12 inserted into the finger receiving unit 45a with the camera 46a, thereby obtaining the image of the drawing finger 12 including the nail 11.

The nail-information detecting unit 59 detects the nail information of the nail 11 from the image of the nail 11 of the drawing finger 12 inserted into the finger receiving unit 45a and photographed by the camera 46a. The nail information includes the outline (a shape and a horizontal position) and the curvature of the nail 11.

The displaying operation controlling unit 60 controls the displaying unit 32 to display various sorts of data thereon. For example, the displaying operation controlling unit 60 controls the displaying unit 32 to display thereon the image selection screen for selecting a design image, the thumbnail image for confirming the selected design image, the nail image contained in the image of photographed drawing finger 12, and various sorts of instruction images.

The drawing image controlling unit 61 outputs drawing image data created by the image processing unit 64 to the moving device 80 and the drawing unit 70, thereby controls the operation of the driving unit 85 of the moving device 80 and the drawing unit 70 to draw an image on the nail 11 with the pen 20 in accordance with the drawing image data.

The calculating unit 62 acquires the lengths (width, length) of the nail 11 in the lateral and longitudinal directions respectively from the outline of the image of the nail 11 photographed by the photographing unit 46. As will be described later, the key point is set on the design image. Based on the acquired lengths (width, length) of the nail 11 in the lateral and longitudinal directions, the calculating unit 62 fits an adjusted design image (to be described later) to an drawing region of the nail 11 (an area where the adjusted design image is drawn) such that the key point of the adjusted design image will meet an adjustment point on the nail 11, wherein the adjustment point is defined on the nail 11 so as to have the same ratios of distances of the key point on the design image in the longitudinal and lateral directions respectively.

After the adjusted design image has been fitted by the calculating unit 62, the drawing unit 70 draws the adjusted design image on the nail 11.

The calculating unit 62 determines based on the image of the drawing finger 12 obtained by the photographing unit 46 that the direction "Y" which the finger 12 indicates is the longitudinal direction of the nail 11 and the direction "X" which crosses with the direction "Y" at right angles is the lateral (width) direction of the nail 11.

The comparing unit 63 divides the lateral length of the nail 11 in the lateral direction by the longitudinal length of the nail 11 in the longitudinal direction to obtain the ratio (first ratio) of length to width of the nail 11, and also divides the lateral length of the design image in the lateral direction by the longitudinal length of the design image in the longitudinal direction to obtain the ratio (second ratio) of length to width of the design image. Then, the comparing unit 63 compares the ratio of length to width of the nail 11 with the ratio of length to width of the design image to control a size enlarging/reducing process to be performed by the image processing unit 64.

The image processing unit 64 enlarges or reduces in size the design image with the ratio of width to length of the design image kept unchanged, depending on the result of the comparison made by the comparing unit 63 to generate an adjusted design image. More specifically, when it is determined that the ratio of length to width of the design image is larger than the ratio of length to width of the nail 11, the image processing unit 64 performs the size enlarging/reducing process so as to make the longitudinal length of the design image in the longitudinal direction equal to the longitudinal length of the nail 11 in the longitudinal direction. Meanwhile, when it is determined that the ratio of length to width of the design image is smaller than the ratio of length to width of the nail 11, the image processing unit 64 performs the size enlarging/reducing process so as to make the lateral length of the design image in the lateral direction equal to the lateral length of the nail 11 in the lateral direction.

Figure 4:
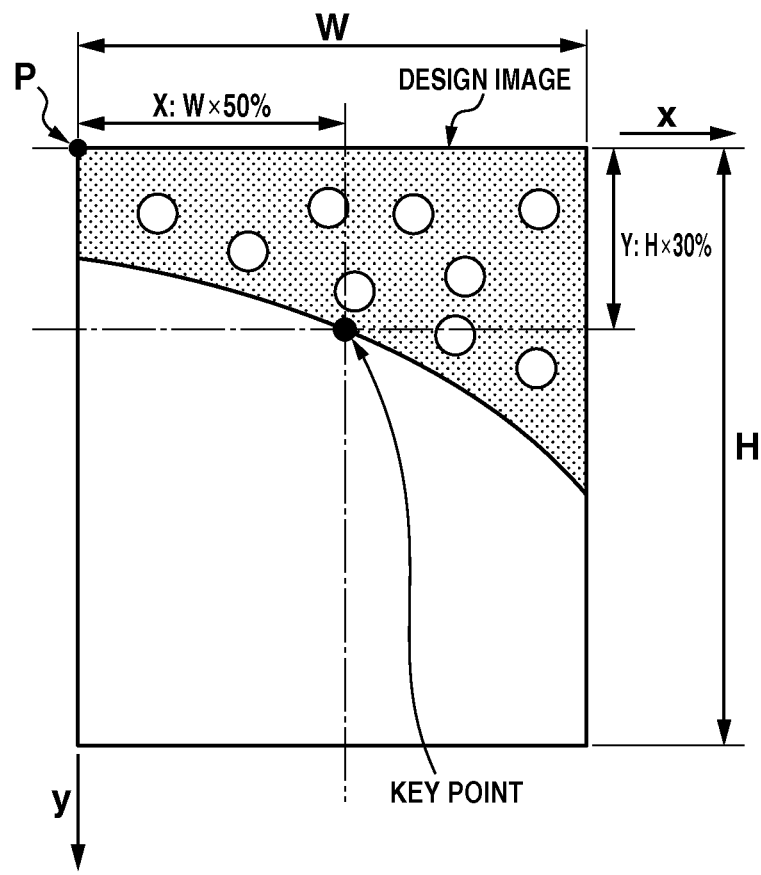
FIG. 4 is a view showing an example of a design image to be drawn on a nail, used in the nail printer according to the embodiments of the invention.

FIG. 4 is a view showing an example of the design image to be drawn on the nail 11. FIG. 5 is a view showing an example of a data format of design-image data. The design-image data is stored in the design storing area 57 of the storing unit 53. In the example of the design image shown in FIG. 4, the key point is set in the vicinity of the center of the design image.

In the design image, the key point serves as a position which determines total balance of the shape of the design image, and is set at a position which the user wants to designate within the drawing region of the surface of the nail with the design image fitted to the drawing region of the surface of the nail.

The key point is set at a position disposed in the drawing region of the surface of the nail with the adjusted design image fitted to the drawing region of the surface of the nail.

That is, when the design image is formed in rectangle, and the adjusted design image of such rectangular design image is fitted to the drawing region of the surface of the nail, in most cases the four corners of the adjusted design image and the vicinities thereof will be out of the drawing region of the nail. Therefore, the key point will not be set at the corners and/or in the vicinity thereof, when the design image is rectangular.

An example of the design image shown in FIG. 4 is French design. In French design, it is important for good balance in design that a curved line is drawn obliquely and a ratio of the upper and lower portions of the curved line is set to a value defined in the design image. Therefore, the key point is set in the vicinity of the center of the curved line of the design image.

The position of the key point is usually defined by a designer of the design image and is previously set as a part of the image data, and the key point is not drawn in the image.

FIG. 4 is a view showing the design image with a key point set therein. The key point is indicated by a round point and its position is defined in the image data.

As one example, assuming that a lateral length of the design image in the lateral direction is given by a width "W" and a longitudinal length of the design image in the longitudinal direction is given by a height "H" and that an x- and y-axes are set in the horizontal and vertical directions respectively with the origin "P" at the top left corner of the design image, then the position (coordinate) of the key point will be represented by W×50% along the x-axis from the origin "P" (X: W×50%) and H×30% along the y-axis from the origin "P" (Y: H×30%), as shown in FIG. 4.

Figure 9:
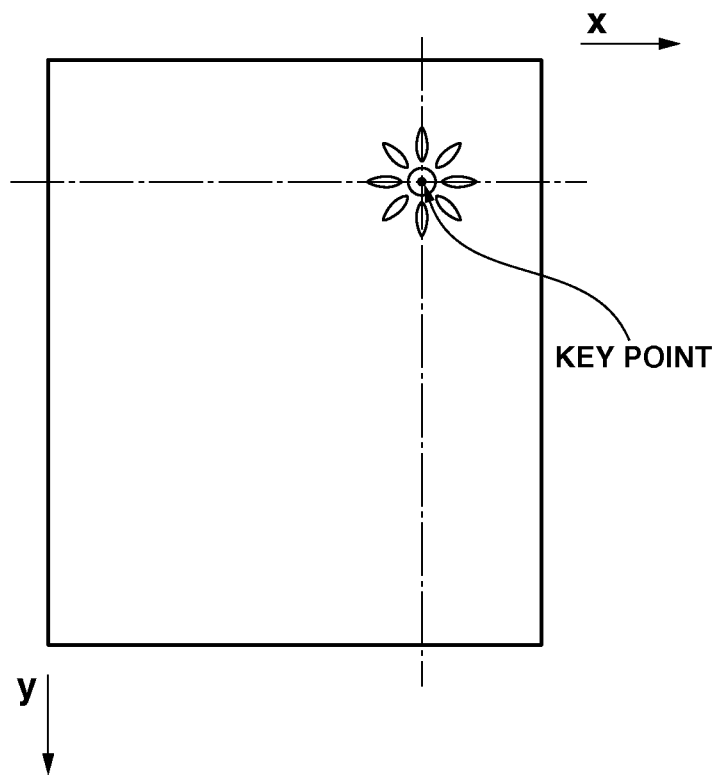
FIG. 9 is a view showing an example of another design image.

The position of the key point described above is one example, and is not restricted to the above. For example, the key point can be set at any position far apart from the center of the design image, as shown in FIG. 9. In FIG. 9, the key point is represented by a flower design located approximated at a top left of the design image.

That is, in the design image the key point serves as a position which determines total balance of the shape of the design image, and is set at a position whose balance the user does not want to change within the drawing region of the surface of the nail with the design image fitted to the drawing region of the surface of the nail. The position of the key point is basically set by the designer of the design image.

The design image data shown in FIG. 5 has a header of the drawing data corresponding to the design image shown in FIG. 4, which header contains parameters such as a "mode NO" of the design image, a "key point X", a "key point Y", a "design width W" indicating a lateral length of the design image in the lateral direction, a "design length H" indicating a longitudinal length (height) of the design image in the longitudinal direction, and parameters concerning a shape and colors of the design image.

The "mode NO" is used for discriminating a method of fitting the design image. In the present embodiment, a mode "1" is set. A mode "0" represents a conventional method of fitting the design image. In the case where only one method of fitting the design image is prepared, the parameter of "mode NO" is not required. Numerals indicated by the "design width W" and the "design length H" represent the numbers of steps of the stepping motors in the driving unit 85, respectively, where one step indicates 2 μm. The "key point X" and the "key point Y" indicate a relative position of the x, y coordinates of the key point, respectively, which point is used as a reference for disposing the design image on the nail 11. The "key point X[%]" represent a x-coordinate of the key point and indicates a position along the x-axis and located at X % of the width "W" from the origin "P" (at the top left corner). The "key point Y[%]" represents a y-coordinate of the key point and indicates a position along the y-axis and located at Y (%) of the height "H" from the origin "P".

A point of the design image which is desired to fit to a point on the nail 11 is designated as the key point of the design image. Hereinafter, the point on the nail 11 is referred to as the "adjustment point" of the nail 11.

The adjustment point of the nail 11 is located at a position having the same ratios (X %, Y %) in position as the key point on the design image. The adjustment point X, representing a position along the x-axis will be given by NW×X %, where NW is the lateral length (width) of the nail 11 in the lateral direction, and the adjustment point Y, representing a position along the y-axis will be given by NH×Y %, where NH is the longitudinal length of the nail 11 in the longitudinal direction. Hereinafter, the adjustment point X and the adjustment point Y are collectively referred to as "adjustment point".

(Operation of Embodiments)

Now, a nail-fitting process to be performed in the nail printer 10 according to the embodiments of the invention will be described in detail.

Figure 6:
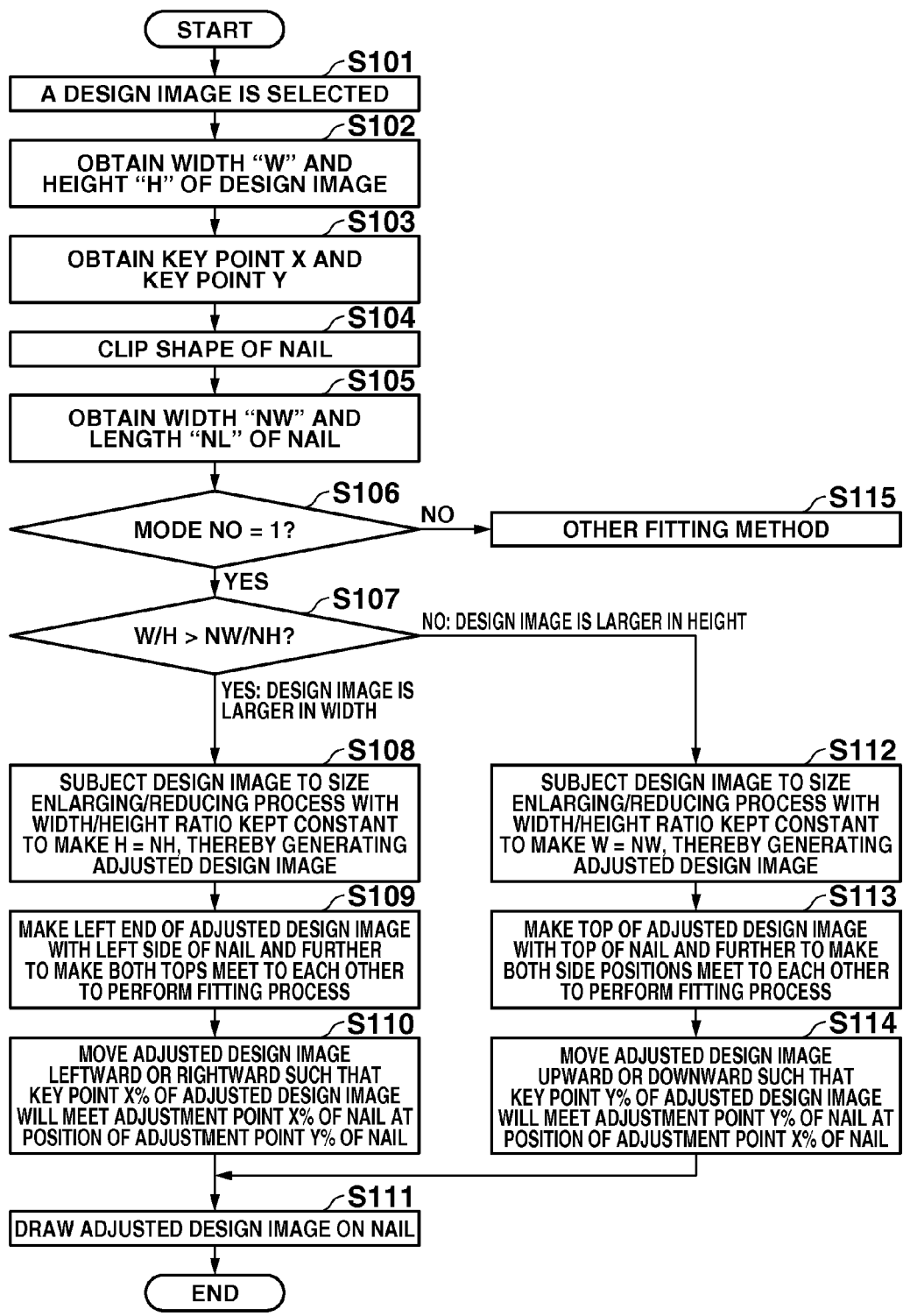
FIG. 6 is a flow chart of a fitting process performed in the nail printer according to the embodiments of the invention.

FIG. 6 is a flow chart of the fitting process performed in the nail printer 10 according to the embodiments of the invention.

The user selects his/her desired design image from among plural design images displayed on the displaying unit (step S101 in FIG. 6). The controlling unit 52 (calculating unit 62) refers to the design-image data stored in the storing unit 53

(design storing area 57) to obtain the width "W" and length (height) "H" of the selected design image (step S102), wherein the design-image data corresponds to the selected design image data. Further, the calculating unit 62 obtains the key point X and the key point Y from the design image data corresponding to the selected design image (step S103).

The user puts his/her finger on the finger receiving unit 45*a* of the nail printer 10, and turns on a start switch of the operation unit 31 to give an instruction of starting the nail-fitting process to the nail printer 10. Then, the photographing unit 46 starts operation, making the lighting lamp 46*b* turn on and the camera(s) 46*a* photograph the finger to obtain a finger image. The calculating unit 62 clips the shape of the nail from the finger image obtained by the photographing unit 46 (step S104), and further, obtains information of the width "NW" and the length "NH" of the nail from the clipped shape of the nail (step S105). In the finger image, the finger indicating direction is set to the longitudinal direction of the nail, and the direction which crosses with the longitudinal direction of the nail at right angles is set to the lateral (width) direction of the nail.

Figure 10:
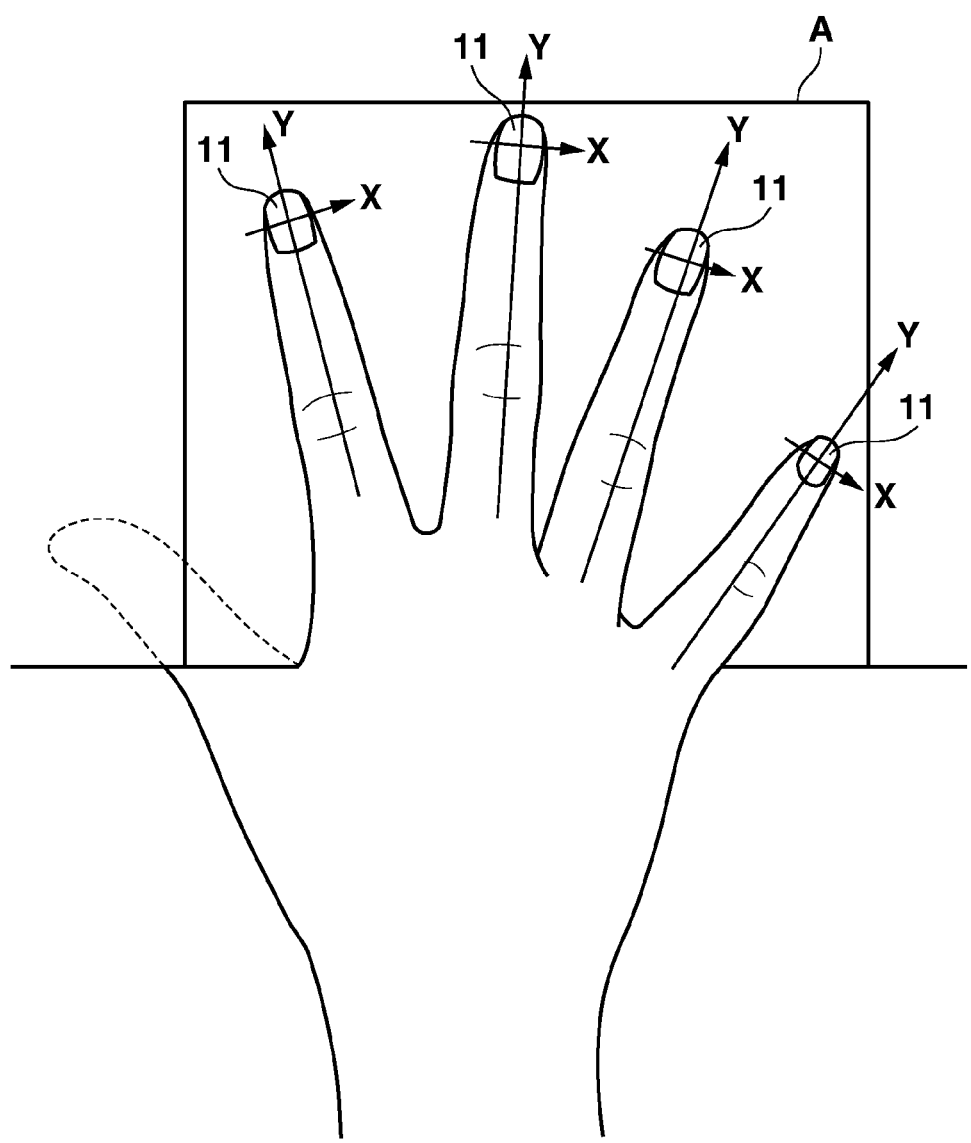
FIG. 10 is a view for explaining how the longitudinal direction of a finger is defined in a photographed image.
Figure 11A:
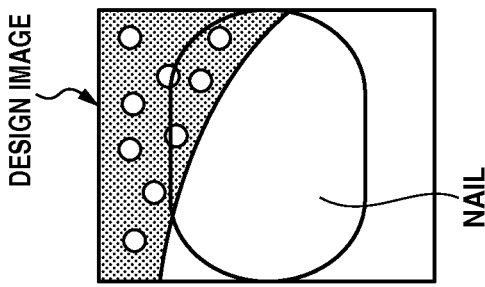
FIG. 11A to FIG. 11D are views for explaining conventional manners for fitting a design image to various shapes of nails.
Figure 11B:
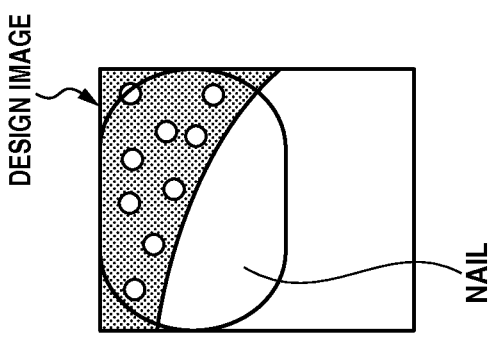
Figure 11C:
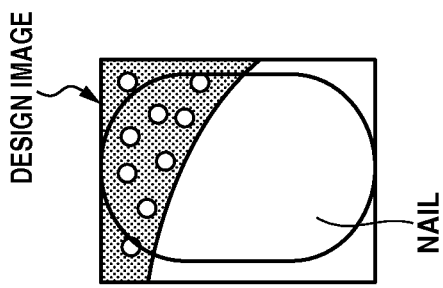
Figure 11D:
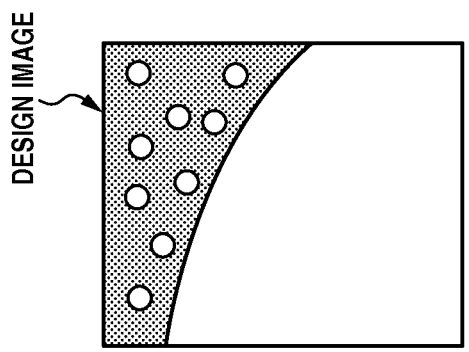

For instance, in the case where the finger receiving unit 45*a* is restricted to the size for receiving only a single finger, the direction of the nail of the drawing finger 12 received in the finger receiving unit 45*a* will not be changed greatly. But, as shown in FIG. 10, in the case where plural fingers can be inserted in the finger receiving unit 45*a* at the same time, the respective fingers can indicate different directions. In the case where the finger directions are different, when the direction indicated by one finger is designated as the longitudinal direction of the nail, it will be possible to obtain the width "NW" and length "NH" of the nails accurately. In FIG. 10, an area "A" indicates the area which can be photographed by the photographing unit 46.

In the case where the size of the finger receiving unit 45*a* is restricted to a single finger, the width "NW" and length "NH" of the nail 11 can be obtained accurately, by setting the direction indicated by the finger to the longitudinal direction of the nail 11. In this case, it is preferable that the finger indicating direction is set to the longitudinal direction of the nail 11 and the direction which crosses with the longitudinal direction of the nail 11 at right angles is set to the lateral (width) direction of the nail 11.

The calculating unit 62 judges whether the mode has been set to "1" or whether the mode "1" has been selected (step S106). When it is determined that the mode has not been set to "1" or that the mode "1" has not been selected (NO at step S106), then the process will be performed in accordance with other fitting method such as a conventional fitting method (step S115). When it is determined that the mode "1" has been selected (YES at step S106), the comparing unit 63 compares the ratio "W/H" of the design image with the ratio "NW/NH" of the nail 11 (step S107). When it is determined that the ratio "W/H" of the design image is larger than the ratio "NW/NH" of the nail 11, that is, that the design image is larger in width than the nail 11 (YES at step S107), the image processing unit 64 performs the size enlarging/reducing process on the design image with the ratio of width/height of the design image maintained constant to make the longitudinal length of the design image in the longitudinal direction equivalent to the longitudinal length of the nail 11 in the longitudinal direction (H=NH), thereby generating an adjusted design image (step S108).

In the case where the ratio "W/H" of the design image is larger than the ratio "NW/NH" of the nail 11, that is, the design image is larger in width than the nail 11, when the length of the adjusted design image is made equivalent to the length of the nail 11 with the width/height ratio kept constant, the width "W" of the adjusted design image will be larger than the width "NW" of the nail 11 at all times and the adjusted design image will cover the whole surface of the nail 11.

Then, the drawing unit 70 performs a fitting process to bring the left end of the adjusted design image to the left end of the nail 11 and further to make the length (height) of the adjusted design image coincide with the length of the nail 11 (step S109). The drawing unit 70 moves the adjusted design image leftward or rightward such that the position of the key point X/100 of the adjusted design image (a position of the design image width "W" x key point X/100) will come to the position of the adjustment point X/100 of the nail 11 (a position of the nail width "NW" x key point X/100 (step S110).

FIG. 7A to FIG. 7D are views schematically showing the processes which are performed at step S108 to step S110, when the ratio "W/H" of the design image is larger than the ratio "NW/NH" of the nail 11, that is, when the design image is larger in width than the nail 11 (YES at step S107). The image processing unit 64 reduces the size of the design image to a size surrounded by a two-dot chain line shown in FIG. 7B with the width/height ratio of the design image kept unchanged, thereby making the longitudinal length "H" of the design image in the longitudinal direction equivalent to the length "NH" of the nail 11 in the longitudinal direction, thereby generating the adjusted design image (step S108). The adjusted design image will have minimum size which covers the whole area of the drawing region of the surface of the nail 11. (When the ratio "W/H" of the design image is larger than the ratio "NW/NH" of the nail 11 and the nail 11 is larger in length "NH" than the design image, then the size of the design image will be enlarged.)

Figure 7D:
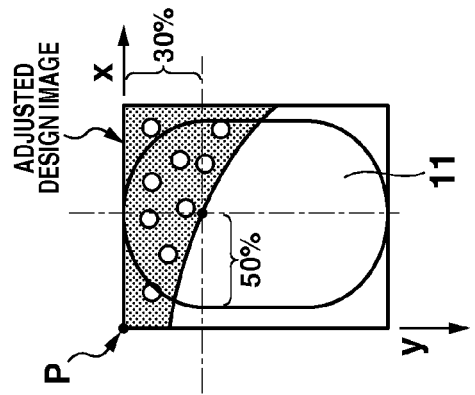
FIG. 7A to FIG. 7D are views for schematically explaining operations performed at step S108 to step 110 in the flow chart of FIG. 6.
Figure 7C:
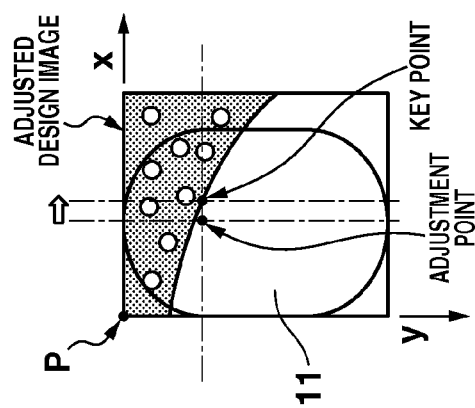
Figure 7B:
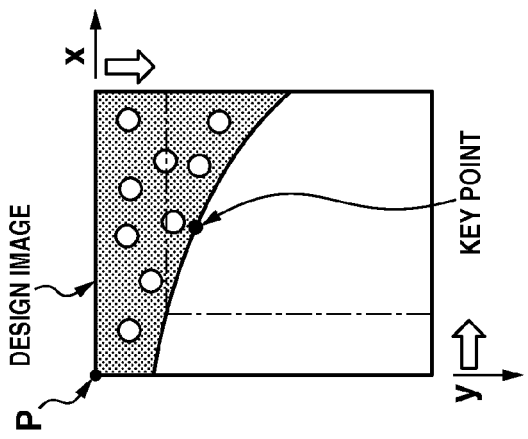
Figure 7A:
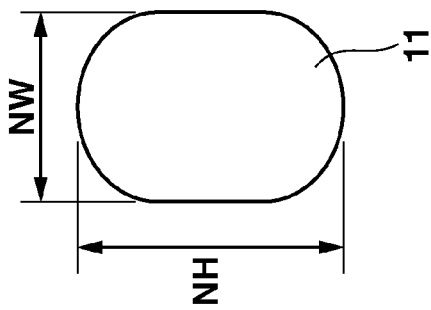

The drawing unit 70 performs the fitting process to align the left end of the adjusted design image with the left end of the nail 11 and to make the height of the adjusted design image coincide with the height of the nail 11, as shown in FIG. 7C (step S109).

In the above size enlarging/reducing process, since the length "H" of the adjusted design image in the longitudinal direction is made equivalent to the length "NH" of the nail 11 in the longitudinal direction, the key point "Y" of the design image will meet the adjustment point "Y" of the nail 11 at a position in the longitudinal direction (in the vertical direction in FIG. 7C) in the fitting process, as shown in FIG. 7C.

Then, the drawing unit 70 moves the adjusted design image leftward or rightward, thereby making the key point "X" (a position of 50% in the width direction) of the adjusted design image meets the adjustment point "X" (a position of 50% in the width direction) of the nail 11 as shown in FIG. 7D (step S110).

In the above description, the origin "P" of the x-y coordinate is set at the top left corner of the adjusted design image, and therefore the fitting operation of the adjusted design image is performed on the basis of the left end of the adjusted design image at first and then the adjusted design image is moved leftward. But if the origin "P" is set at the top right corner of the adjusted design image, the adjusted design image will be moved rightward.

Meanwhile, when the comparing unit 63 compares the ratio "W/H" of the design image with the ratio "NW/NH" of the nail 11 (step S107) and determines that the "W/H" of the design image is not larger than the "NW/NH" of the nail 11, that is, that the design image is larger in height than the nail 11 (NO at step S107), the image processing unit 64 performs the size enlarging/reducing process on the design image with the ratio "W/H" of the design image maintained unchanged to make the lateral length (width) of the design image in the lateral direction equivalent to the lateral length (width) of the nail 11 in the lateral direction (W=NW) (step S112).

In the present case, the ratio "W/H" of the design image is not larger than the ratio "NW/NH" of the nail 11 and the design image is larger in height than the nail 11. Therefore, when the size enlarging/reducing process is performed so as to make the width "W" of the design image equivalent to the width "NW" of the nail 11, the size of the adjusted design image will be large enough to cover the whole area of the drawing region of the surface of the nail 11 at all times.

Further, the drawing unit 70 performs the fitting operation to align the top end of the adjusted design image with the top end of the nail 11 and further to make the lateral length (width) of the adjusted design image in the lateral direction coincide with the lateral length (width) of the nail 11 in the lateral direction (step S113). Further, the drawing unit 70 moves the adjusted design image upward or downward such that the key point Y/100 of the adjusted design image (a position of the design image length "H" x X/100) will meet the adjustment point Y/100 of the nail 11 (a position of the nail length "NH" x X/100) (step S114).

FIG. 8A to FIG. 8D are views schematically showing the processes which are performed at step S112 to step S114, when the ratio "W/H" of the design image is smaller than the ratio "NW/NH" of the nail 11, that is, when the design image is larger in height than the nail 11 (NO at step S107). The image processing unit 64 reduces the size of the design image to a size surrounded by a two-dot chain line shown in FIG. 8B with the ratio "W/H" of the design image kept unchanged, thereby making the width "W" of the design image equivalent to the width "NW" of the nail 11 (step S112). (When "W/H" of the design image is smaller than "NW/NH" of the nail 11 and the nail 11 is larger in width "NW" than the design image, then the size of the design image will be enlarged.)

Figure 8A:
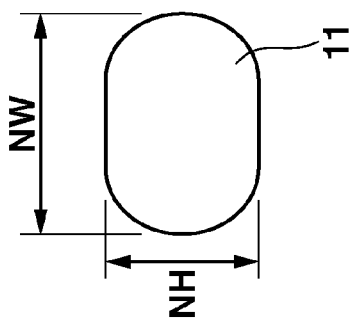
FIG. 8A to FIG. 8D are views for schematically explaining operations performed at step S112 to step 114 in the flow chart of FIG. 6.
Figure 8B:
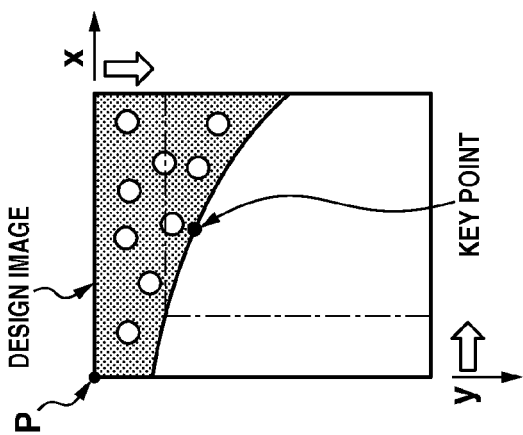
Figure 8C:
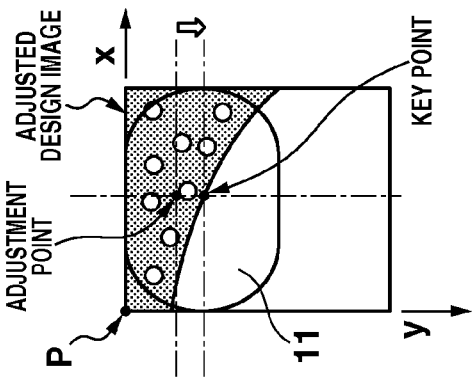

The drawing unit 70 performs the fitting process to align the top end of the adjusted design image with the top end of the nail 11 and to make the length (width) of the design image in the lateral direction coincide with the length (width) of the nail 11 in the lateral direction, as shown in FIG. 8C (step S113).

In the above size enlarging/reducing process, since the width "W" of the adjusted design image is made equivalent to the width "NW" of the nail 11, the key point "X" of the design image will meet the adjustment point "X" of the nail 11 in the lateral direction in the fitting process, as shown in FIG. 8C.

Figure 8D:
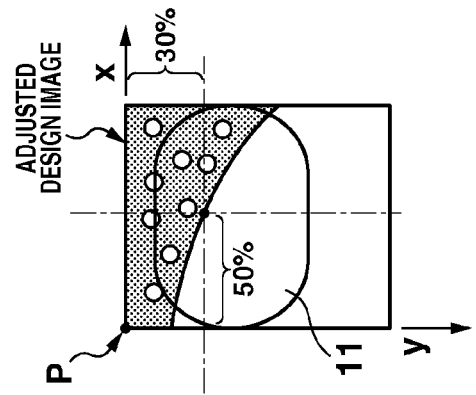

Then, the drawing unit 70 moves the adjusted design image upward or downward, thereby making the key point "Y" (a position of 30% in the longitudinal direction) of the adjusted design image meets the adjustment point "Y" (a position of 30% in the longitudinal direction) of the nail 11, as shown in FIG. 8D (step S114).

In the above description, the origin "P" of the x-y coordinate is set at the top left corner of the adjusted design image, and therefore the fitting operation of the adjusted design image is performed on the basis of the top of the adjusted design image at first and then the design image is moved upward. But if the origin "P" is set at the top right corner of the adjusted design image, the adjusted design image will be moved downward.

As described above, the key point of the adjusted design image, a position at 50% in the lateral direction and at 30% in the longitudinal direction, is fitted to the adjustment point of the mail 11 at 50% in the lateral direction and at 30% in the longitudinal direction, as shown in FIG. 7D and FIG. 8D. Therefore, the desired French design can automatically be fitted to the nail 11 properly.

With the adjusted design image subjected to the size enlarging/reducing process (step S109, step S112) and moved in the lateral direction or in the longitudinal direction such that the key point of the adjusted design image will meet the adjustment point of the nail 11 (step S110, step S114) (Refer to FIG. 7D and FIG. 8D), wherein the adjustment point is defined on the nail 11 so as to have the same ratios respectively in the lateral and longitudinal directions as the key point on the adjusted design image, the drawing unit 70 draws said adjusted design image on the nail 11 at step S111, finishing the fitting process.

Although not described in the flow chart of FIG. 6, when a design image is drawn on the nail 11 before the adjusted design image was drawn on the nail 11 at step S111, it is possible to show on the displaying unit 32 how said design image will be drawn on the nail 11 and to allow the user to start the image drawing process at step S111, if said design image drawn on the nail is acceptable for him/her. When the design image drawn on the nail 11 is not acceptable for him/her, it will be preferable to allow the user to revise the design image or to restart the fitting process from the beginning (from step S101).

In the nail printer 10 according to the embodiments of the invention, the data of the design image contains the information of the key point (key point X, key point Y) in addition to the information of the lateral length (width) of the design image in the lateral direction and the longitudinal length of the design image in the longitudinal direction. Meanwhile, the nail 11 is photographed to obtain the image thereof, and the adjustment point is defined on the image of nail 11 at a position corresponding to the key point of the design image such that the position has the same ratios in the lateral and longitudinal directions as the key point of the design image. The key point of the adjusted design image is brought to the adjustment point of the nail 11, whereby the design image can automatically be fitted to various shapes of the nail in good balance. In particular, when arrangement balance for the whole surface of the nail 11 is important for design as in "French design", and when it is important in view of design that a design is located at a specific position on the surface of the nail 11, specifically, the above function is useful.

In the case that, when the ratio of width to height of the design image is changed, for instance, when the design such as a round or star-shape design is greatly changed, the technique of fitting the design image to the nail 11 with the ratio of width to height kept constant can be used effectively.

In the above description of the embodiments of the invention, the drawing unit of the nail printer 10 is provided with only the pen plotters, but an ink jet printer can be used as the drawing unit or bot the ink jet printer and pen plotter can be used.

Although specific configurations of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

What is claimed is:

1. A drawing apparatus comprising:
a controlling unit which
adjusts a size of a design image formed by a image data, the image data includes position information of a key point which is predetermined set, the position information indicates a position of the key point in the design image, without changing (a) a ratio of a longitudinal length and a lateral length of the design image and (b) a relative position of the key point in the design image,
generates an adjusted design image from the design image whose size has been adjusted, and
fits, as a fitting process, the adjusted design image to a drawing region of a nail of a finger or a toe of a user; and
a drawing unit which draws the adjusted design image on the drawing region fitted by the controlling unit,
wherein
the controlling unit
sets an adjustment point in the drawing region at the same relative positions in the longitudinal and the lateral directions as the key point set on the design image,
sets a longitudinal direction and a lateral direction of the adjusted design image to the longitudinal direction and the lateral direction of the drawing region,
sets a size of the adjusted design image to minimum size which covers the whole area of the drawing region, and
sets, in the fitting process, the adjusted design image to the drawing region at a position which the key point of the adjusted design image meets the adjustment point.

2. The drawing apparatus according to claim 1, wherein the controlling unit
obtains a longitudinal length and a lateral length of the drawing region from an image obtained by photographing the nail, and
when a ratio of a longitudinal distance between one side of the design image and the key point to the longitudinal length of the design image is a first ratio, and a ratio of a lateral distance between one side of the design image and the key point to the lateral length of the design image is a second ratio, sets the position of the adjustment point in the drawing region in the longitudinal direction such that a ratio of a longitudinal distance between one side of the drawing region and the longitudinal length of the drawing region will be the first ratio; and sets the position of the adjustment point in the drawing region in the lateral direction such that a ratio of a lateral distance between one side of the drawing region and the lateral length of the drawing region will be the second ratio.

3. The drawing apparatus according to claim 1, wherein the controlling unit decides based on the image obtained by photographing the finger or the toe that the direction in which the finger or the toe extends is the longitudinal direction of the drawing region.

4. The drawing apparatus according to claim 1, wherein the controlling unit calculates an first aspect ratio of the drawing region which is a ratio of a lateral length of the drawing region to a longitudinal length of the drawing region and an second aspect ratio of the design image which is a ratio of the lateral length of the design image to the longitudinal length of the design image, and generates the adjusted design image based on a result of comparison between the first aspect ratio and the second aspect ratio.

5. The drawing apparatus according to claim 4, wherein the controlling unit
sets a longitudinal length of the adjusted design image equal to the longitudinal length of the drawing region when the second aspect ratio is larger than the first aspect ratio, thereby generates the adjusted design image, and
sets a lateral length of the adjusted design image equal to the lateral length of the drawing region when the second aspect ratio is smaller than the first aspect ratio, thereby generates the adjusted design image.

6. A control method of a drawing apparatus, the method comprising the steps of:
a step of adjusting a size of a design image formed of image data, the image data including position information which indicates a position of a key point previously set on a design image, without changing (a) a ratio of a longitudinal length to a lateral length of the design image and (b) a relative position of the key point on the design image;
a step of generating an adjusted design image from the design image whose size has been adjusted;
a step of setting an adjustment point in the drawing region at the same relative positions in the longitudinal and lateral directions as the key point set on the design image;
a step of fitting the adjusted design image to a drawing region of a nail of a finger or a toe of a user; and
a step of drawing the adjusted design image on the drawing region fitted in the step of fitting,
wherein
the step of generating the adjusted design image includes:
a step of setting a longitudinal direction and a lateral direction of the adjusted design image to the longitudinal direction and the lateral direction of the drawing region, and
a step of setting the adjusted design image to minimum size which covers the whole area of the drawing region,
the step of fitting the adjusted design image includes a step of setting the adjusted design image to the drawing region at a position which the key point of the adjusted design image meets the adjustment point.

7. The control method of the drawing apparatus, according to claim 6, wherein
the step of setting the adjustment point includes:
a step of obtaining a longitudinal length and a lateral length of the drawing region from an image obtained by photographing the nail,
a step of setting the position of the adjustment point in the drawing region in the longitudinal direction such that a ratio of a longitudinal distance between one side of the drawing region and the longitudinal length of the drawing region will be a first ratio; and
a step of setting the position of the adjustment point in the drawing region in the lateral direction such that a ratio of a lateral distance between one side of the drawing region and the lateral length of the drawing region will be a second ratio,
when a ratio of the longitudinal distance between one side of the design image and the key point to the longitudinal length of the design image is the first ratio and a ratio of the lateral distance between one side of the design image and the key point to the lateral length of the design image is the second ratio.

8. The control method of the drawing apparatus, according to claim 6, further comprising:
a step of deciding based on an image obtained by photographing the finger or the toe that the direction in which the finger or the toe extends is the longitudinal direction of the drawing region.

9. The control method of the drawing apparatus, according to claim 6, wherein
the step of generating an adjusted design image includes:
a step of calculating an first aspect ratio of the drawing region which is a ratio of a lateral length of the drawing region to a longitudinal length of the drawing region and an second aspect ratio of the design image which is a ratio of the lateral length of the design image to the longitudinal length of the design image; and
a step of generating the adjusted design image based on a result of comparison between the first aspect ratio and the second aspect ratio.

10. The control method of the image drawing apparatus, according to claim 9, wherein
at the step of generating the adjusted design image,
sets a longitudinal length of the adjusted design image equal to the longitudinal length of the drawing region when the second aspect ratio is larger than the first aspect ratio, thereby generating the adjusted design image, and
sets a lateral length of the adjusted design image equal to the lateral length of the drawing region, when the second aspect ratio is smaller than the first aspect ratio, thereby generating the adjusted design image.

* * * * *